(12) United States Patent
Ichikawa et al.

(10) Patent No.: US 6,726,141 B1
(45) Date of Patent: Apr. 27, 2004

(54) SEAT BELT DEVICE HAVING SEAT BELT RETRACTOR WITH LOCK MECHANISM

(75) Inventors: Shu Ichikawa, Kanagawa (JP); Masuo Matsuki, Kanagawa (JP)

(73) Assignee: NSK Autoliv Co., Ltd., Kanagawa (JP)

( * ) Notice: Subject to any disclaimer, the term of this patent is extended or adjusted under 35 U.S.C. 154(b) by 0 days.

(21) Appl. No.: 10/111,707
(22) PCT Filed: Oct. 23, 2000
(86) PCT No.: PCT/JP00/07384

§ 371 (c)(1),
(2), (4) Date: Aug. 7, 2002

(87) PCT Pub. No.: WO01/30613
PCT Pub. Date: May 3, 2001

(30) Foreign Application Priority Data

Oct. 28, 1999 (JP) ............................................. 11-307081

(51) Int. Cl.[7] ........................ B60R 22/405; B60R 22/41
(52) U.S. Cl. ................................... 242/383.4; 242/384.6
(58) Field of Search .......................... 242/383.4, 383.2, 242/383.5, 384, 384.5, 384.6; 280/806; 297/478

(56) References Cited

U.S. PATENT DOCUMENTS

| | | | | |
|---|---|---|---|---|
| 4,564,154 A | * | 1/1986 | Takada | ..................... 242/383.4 |
| 5,388,780 A | * | 2/1995 | Matsuki | ..................... 242/384 |
| 5,480,105 A | * | 1/1996 | Fujimura et al. | ......... 242/383.2 |
| 6,068,208 A | * | 5/2000 | Matsuki et al. | .......... 242/383.2 |
| 6,152,393 A | * | 11/2000 | Ando et al. | .............. 242/383.5 |

FOREIGN PATENT DOCUMENTS

| | | |
|---|---|---|
| GB | 2264631 A | 9/1993 |
| JP | 8-290753 A | 11/1996 |
| WO | WO 90/09910 A1 | 9/1990 |

* cited by examiner

*Primary Examiner*—John M. Jillions
(74) *Attorney, Agent, or Firm*—Sughrue Mion, PLLC (57) ABSTRACT

There is provided a seat belt apparatus which not only can reduce the possibility that an end lock phenomenon can occur when removing the mounting of a webbing but also, even in case where the end lock phenomenon occurs, can remove the end lock phenomenon easily. That is, in a seat belt apparatus including a seat belt retractor having a lock mechanism structured such that, when the acceleration of a vehicle body or the pay-out acceleration of a webbing is a predetermined value or more, a pawl member (15) is engaged with a pawl wheel (13) to lock the rotation of a bobbin (2) with the webbing wound thereon in the webbing pay-out direction, the pawl wheel (13) is structured such that two or more kinds of ratchet teeth (T1) and (T2) differing in addendum circle diameter are mixedly arranged in the peripheral direction of the pawl wheel according to a predetermined manner, thereby being able to lower the probability of the webbing end lock occurring.

3 Claims, 13 Drawing Sheets

PRIOR ART

FIG. 13

PRIOR ART

SEAT BELT DEVICE HAVING SEAT BELT RETRACTOR WITH LOCK MECHANISM

TECHNICAL FIELD

The present invention relates to a seat belt apparatus including a seat belt retractor with a lock mechanism capable of engaging a pawl member with a pawl wheel to thereby lock a bobbin with a webbing wound thereon from rotating in the webbing pay-out direction thereof.

BACKGROUND ART

A seat belt apparatus for holding the occupant of a vehicle on a seat in safety comprises a webbing, a buckle, a mounting device, and a retractor for a seat belt (which is also referred herein to as a seat belt retractor).

The seat belt retractor is a winding device which not only, when the seat belt is not in use, automatically takes up the webbing to thereby prevent the webbing against damage and but also, when the seat belt is in use, is capable of changing the length of the webbing freely.

As the seat belt retractor of this type, generally, there is used a seat belt retractor including an emergency lock mechanism structured such that it can physically lock the pay-out of the webbing according to the action of inertia sensing means capable of reacting to sudden acceleration, a collision, or sudden deceleration, whereby the seat belt retractor is able to restrict the occupant effectively and safely using the thus-structured emergency lock mechanism.

And, as the emergency lock mechanism of this type, there is spread a lock mechanism structured such that, in case where the acceleration of the vehicle or the pay-out acceleration of the webbing is equal to or greater than a given level, a pawl member is engaged with a pawl wheel to thereby be able to lock or prevent a bobbin with the webbing wound thereon against rotation in the webbing pay-out direction thereof.

Figure 12:
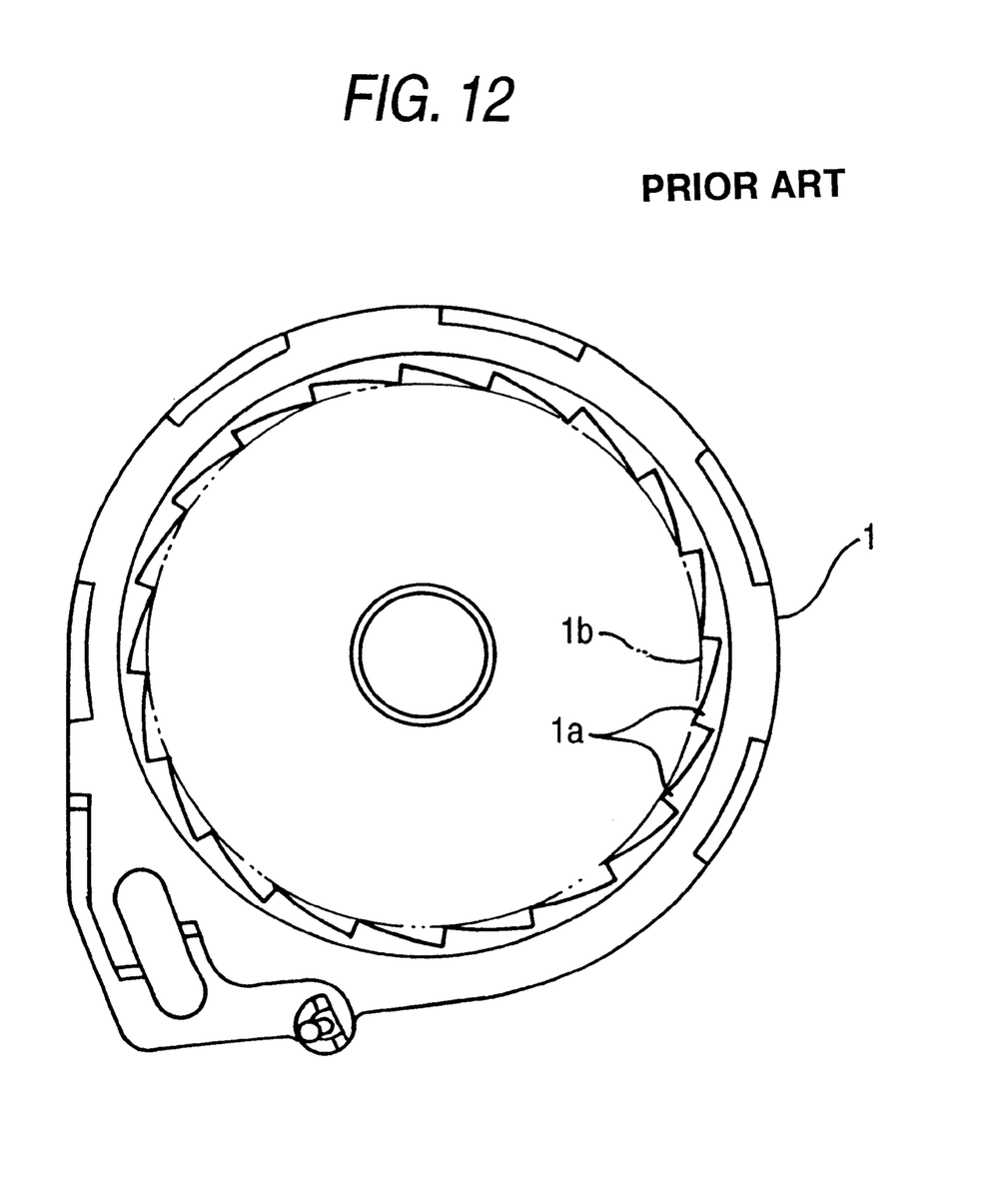
FIG. 12 is a front view of a conventional pawl wheel including a plurality of ratchet teeth formed in the inner peripheral portion thereof at regular intervals; and, FIG. 13 is a front view of a conventional pawl wheel including a plurality of ratchet teeth formed in the outer peripheral portion thereof at regular intervals.
Figure 13:
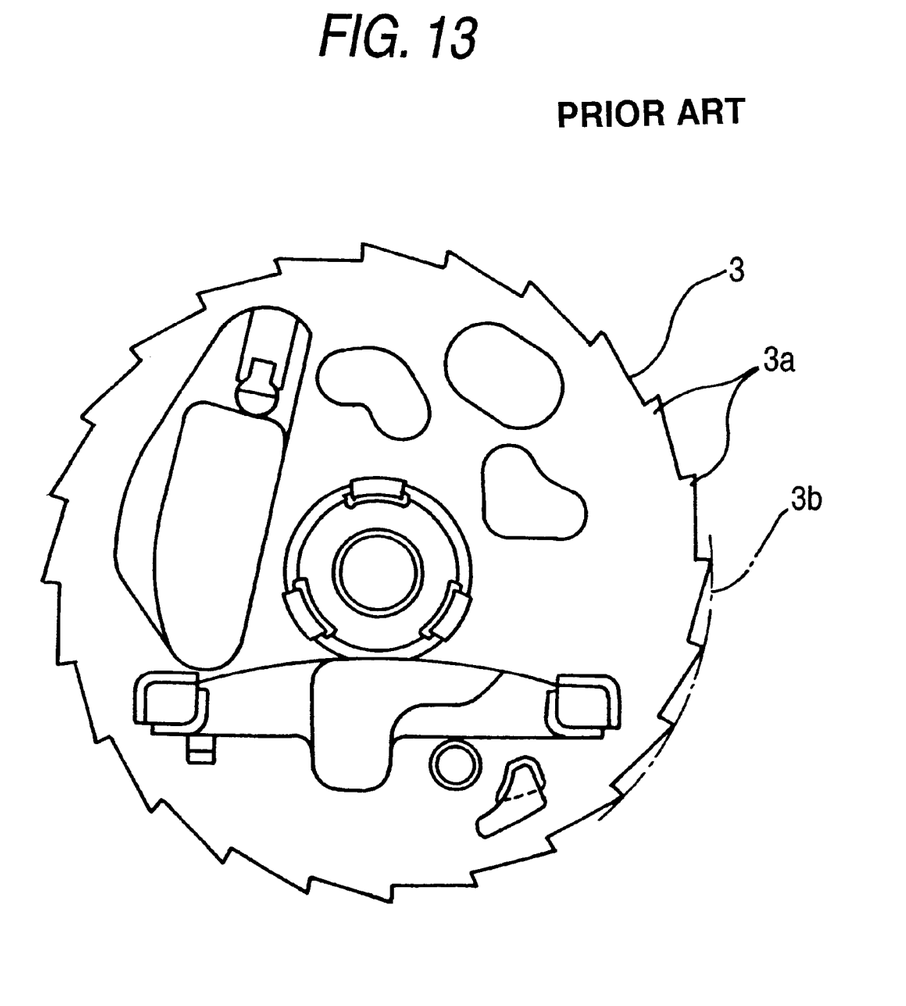

Now, FIGS. 12 and 13 show a conventional example of a pawl wheel used in the lock mechanism of this type.

A pawl wheel 1, which is shown in FIG. 12, has a structure that ratchet teeth 1a to be engaged with the pawl member are formed in the inner peripheral portion thereof at regular intervals.

Also, a pawl wheel 3, which is shown in FIG. 13, is structured such that ratchet teeth 3a to be engaged with the pawl member are formed in the outer peripheral portion thereof at regular intervals.

By the way, in the case of an emergency lock mechanism using a pawl wheel, generally, for example, in case where the pay-out acceleration of the webbing exceeds 2.0 G, the pawl member an be engaged with the pawl wheel.

However, on the webbing that has been played out from the retractor, there is applied the urging force of a winding spring disposed on the retractor. Therefore, when stopping the mounting of the seat belt, in case where the webbing is wound vigorously with all urging force of the winding spring, the winding of the webbing is executed at a fairly quick speed. Thus, due to a reaction to the impact of the webbing when it is wound fully, in a winding shaft, there is instantaneously generated rotation acceleration going in the webbing pay-out direction. The acceleration, which is generated in this case, can exceed the operation standard value of the lock mechanism, that is, 2.0 G. In such case, there is high occurrence probability of an end lock phenomenon, that is, a phenomenon in which the pawl member of the lock mechanism can be engaged with the pawl wheel to thereby prevent the webbing, in a state where the webbing is wound fully, from being played out.

And, in case where such end lock phenomenon occurs, to remove it, there is necessary a lock removal operation in which, for example, the full-wound webbing is forcibly played out once and the thus slightly played-out webbing is returned to thereby remove the locked condition of the webbing, which results in a poor operation efficiency.

Also, in the above-mentioned conventional pawl wheels 1, 3, the plurality of ratchet teeth 1a, 3a, which are respectively arranged along the peripheral directions of the respective pawl wheels, are the same in dimension; and, all of the ratchet teeth are arranged on a single addendum circle 1b or 3b. Therefore, when any one of the ratchet teeth is engaged with the pawl member, there is obtained firm engagement. This means that, when removing the end lock phenomenon, it is difficult to remove the engagement between the ratchet tooth and pawl member at any engaged position.

In view of the above, the present invention aims at solving the above-mentioned problems. Accordingly, it is an object of the invention to provide a seat belt apparatus including a seat belt retractor with a lock mechanism, structured such that, when removing the mounting of the webbing, even in case where the webbing is returned with great force, there can be reduced the possibility of occurrence of the end lock phenomenon and, even in case where the end lock phenomenon occurs, the removal of such end lock phenomenon can be facilitated, thereby being able to improve the lowered operation efficiency due to the occurrence of the end lock phenomenon.

DISCLOSURE OF THE INVENTION

In attaining the above object, according to the invention, there is provided a seat belt apparatus including a seat belt retractor with a lock mechanism structured such that, when the acceleration of a vehicle or the pay-out acceleration of a webbing is equal to or greater than a predetermined value, a pawl member can be engaged with a pawl wheel to thereby lock the rotation of a bobbin with the webbing wound thereon in the webbing pay-out direction thereof, wherein the pawl wheel is structured such that two or more kinds of ratchet teeth differing in addendum circle diameter are mixedly arranged in the peripheral direction of the pawl wheel according to a predetermined manner.

In the above structure, when the vehicle acceleration or the webbing pay-out acceleration is equal to or greater than a predetermined value, the pawl member forming the lock mechanism gets into motion such as rotary motion for engagement with the pawl wheel, while the motion of the pawl member varies according to the acceleration applied thereto; for example, when the acceleration applied is small, the motion of the pawl member is also small.

Generally, the webbing pay-out acceleration to be instantaneously applied to the winding shaft due to reaction to the impact given when the webbing is wound back up to its terminal end in removing the mounting of the webbing, and the vehicle acceleration to be detected by a vehicle acceleration sensor when the door of the vehicle is closed with great force, normally, correspond to the value that exceeds the standard value of the operation of the lock mechanism; however, when compared with the acceleration to be generated in the actual vehicle collision, they are rather small.

And, in case where the pawl member carries out engaging motion with respect to the pawl wheel through the action of such small acceleration, in the case of the above structure, the ratchet teeth to be arranged on the pawl wheel are composed of two or more kinds of ratchet teeth differing in addendum circular diameter; and, therefore, for example, in case where the internal teeth or ratchet teeth to be engaged with the pawl member are structured such that the addendum circle diameter thereof is set larger than the standard one, the pawl member is not be able to reach such ratchet teeth, with the result that their engagement cannot be attained. Also, even when the pawl member is engaged with the pawl wheel to thereby put the webbing into a locked condition, as described above, in case where the internal teeth or ratchet teeth to be engaged with the pawl member are structured such that the addendum circle diameter thereof is set larger than the standard one, since the engagement between the pawl member and the ratchet tooth to be engaged therewith is shallow, a webbing operation force and a webbing operating quantity necessary to remove such webbing locked condition can be reduced when compared with the conventional structure.

That is, according to the above structure, when removing the mounting of the webbing, even in case where the webbing is returned with great force, there can be reduced the possibility of the end lock phenomenon occurring; and, even in case where the end lock phenomenon occurs, there can be enhanced the possibility that the removal of the end lock phenomenon can be facilitated, thereby being able to improve the lowered operation efficiency caused by the end lock phenomenon.

Further, in case where the retractor includes a pre-tensioner, in a locking operation to be executed after the pre-tensioner is operated, the webbing pay-out acceleration to be input rises suddenly, thereby raising a fear that the extension quantity of the webbing can be increased. Therefore, to control the webbing extension quantity down to a small value, preferably, the locking operation maybe execute data nearly stage. According to the above structure, when a sufficiently large level of acceleration is applied in this manner, the pawl member can be engaged with any one of the ratchet teeth, so that the occupant can be restricted positively without increasing the webbing extension quantity.

BEST MODE FOR CARRYING OUT THE INVENTION

Now, description will be given below in detail of the preferred embodiments of a seat belt apparatus including a seat belt retractor with a lock mechanism according to the invention with reference to the accompanying drawings.

Figure 1:
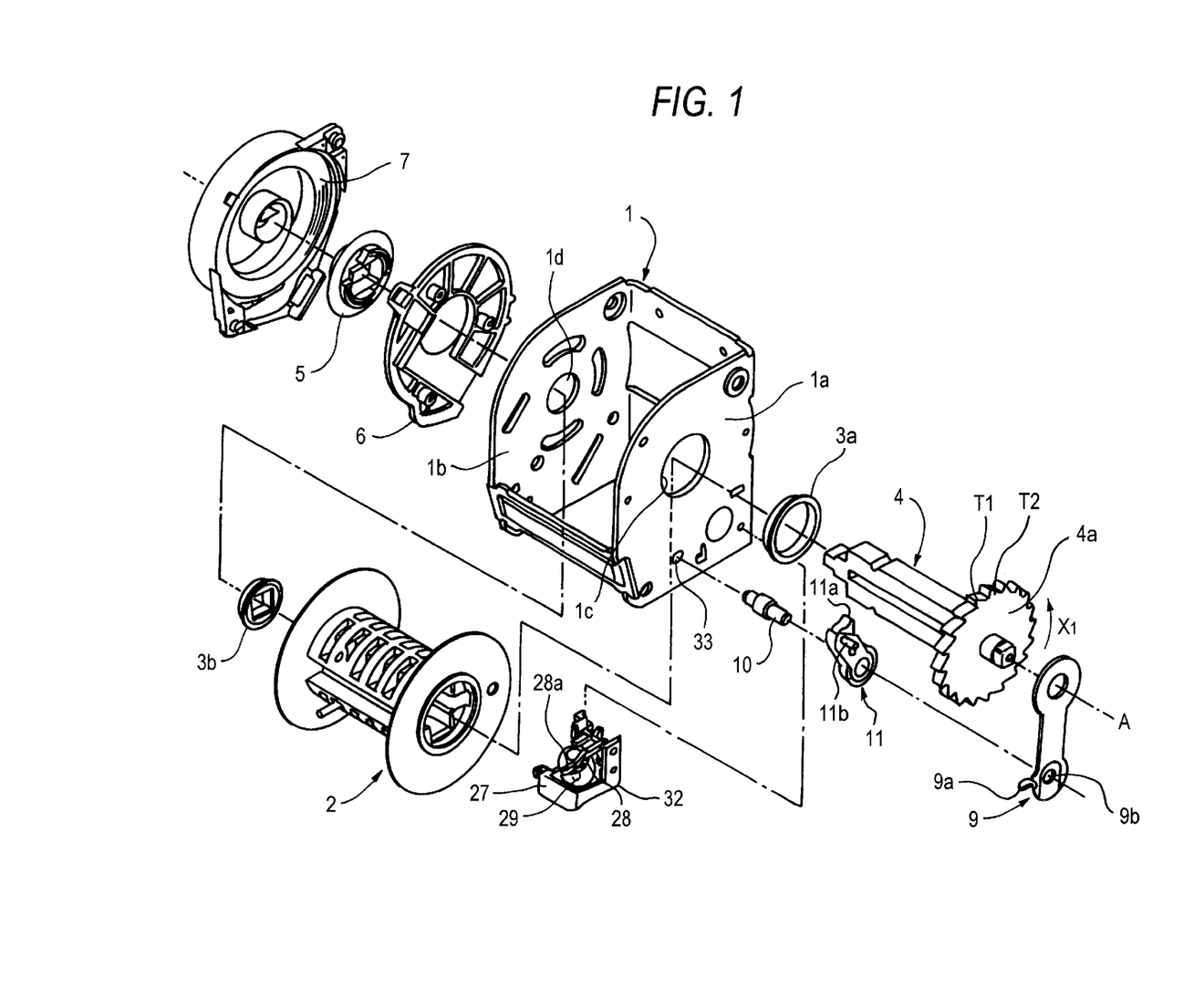
FIG. 1 is an exploded perspective view of a seat belt retractor with a lock mechanism employed in a first embodiment of a seat belt apparatus according to the invention.
Figure 2:
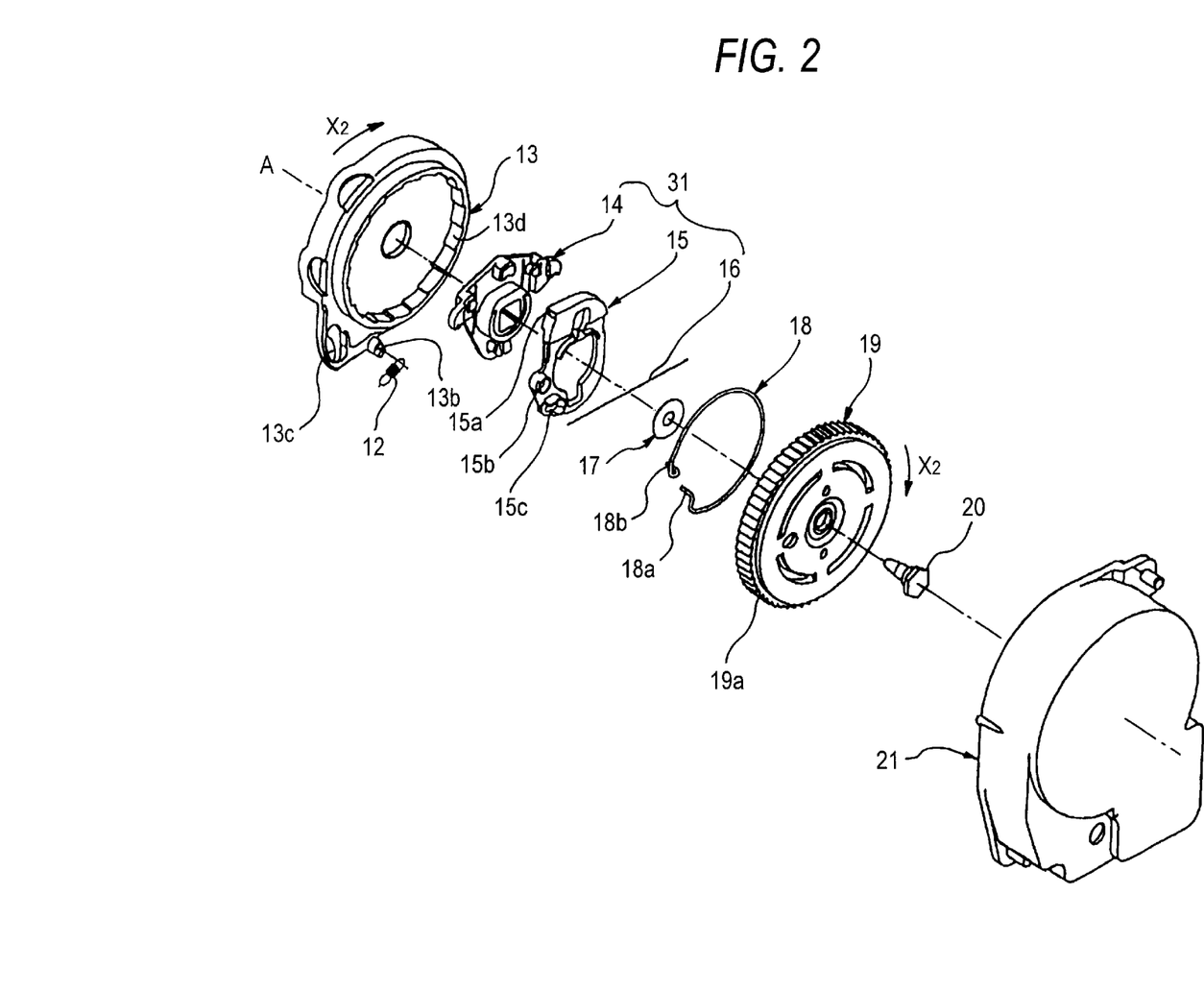
FIG. 2 is an exploded perspective view of the seat belt retractor with the lock mechanism employed in the first embodiment of a seat belt apparatus according to the invention.
Figure 3:
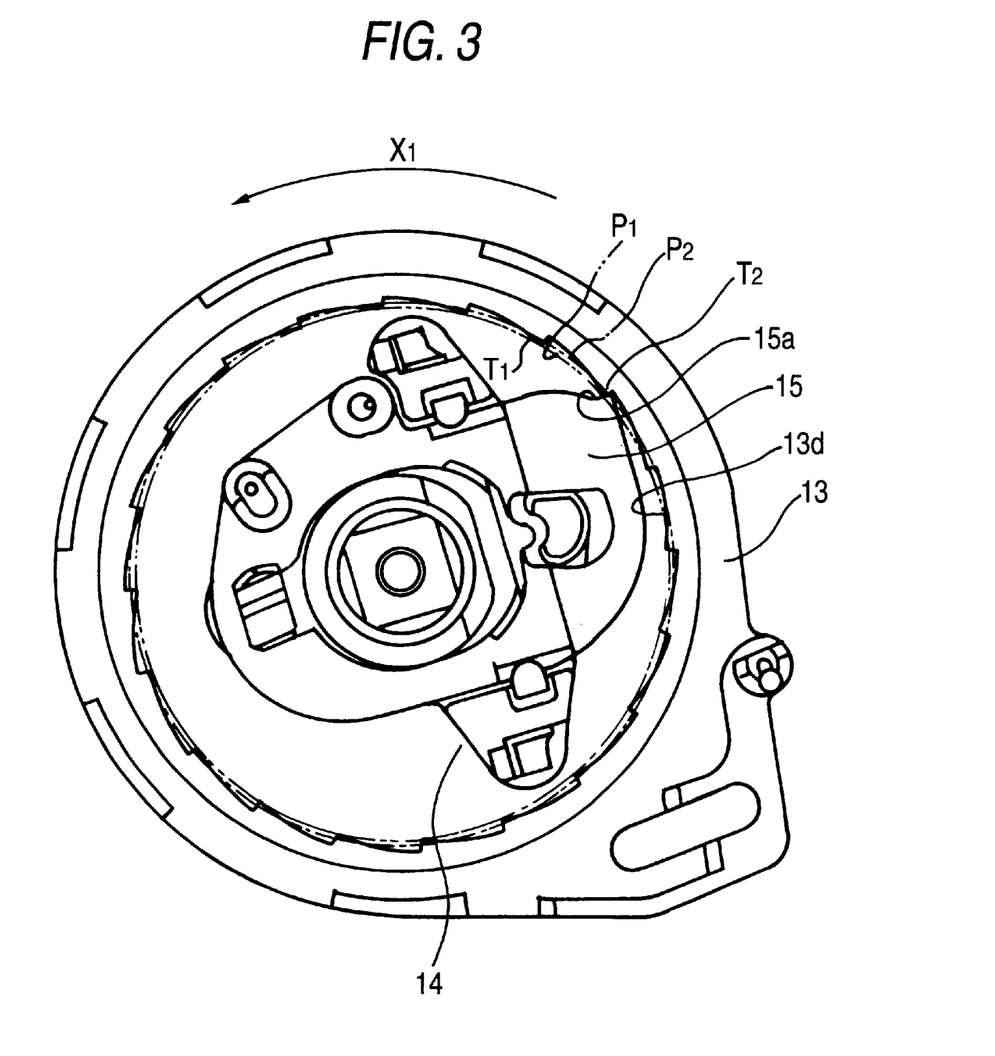
FIG. 3 is a front view of a latch cup serving as a pawl wheel used in the seat belt retractor shown in FIGS. 1 and 2.
Figure 4:
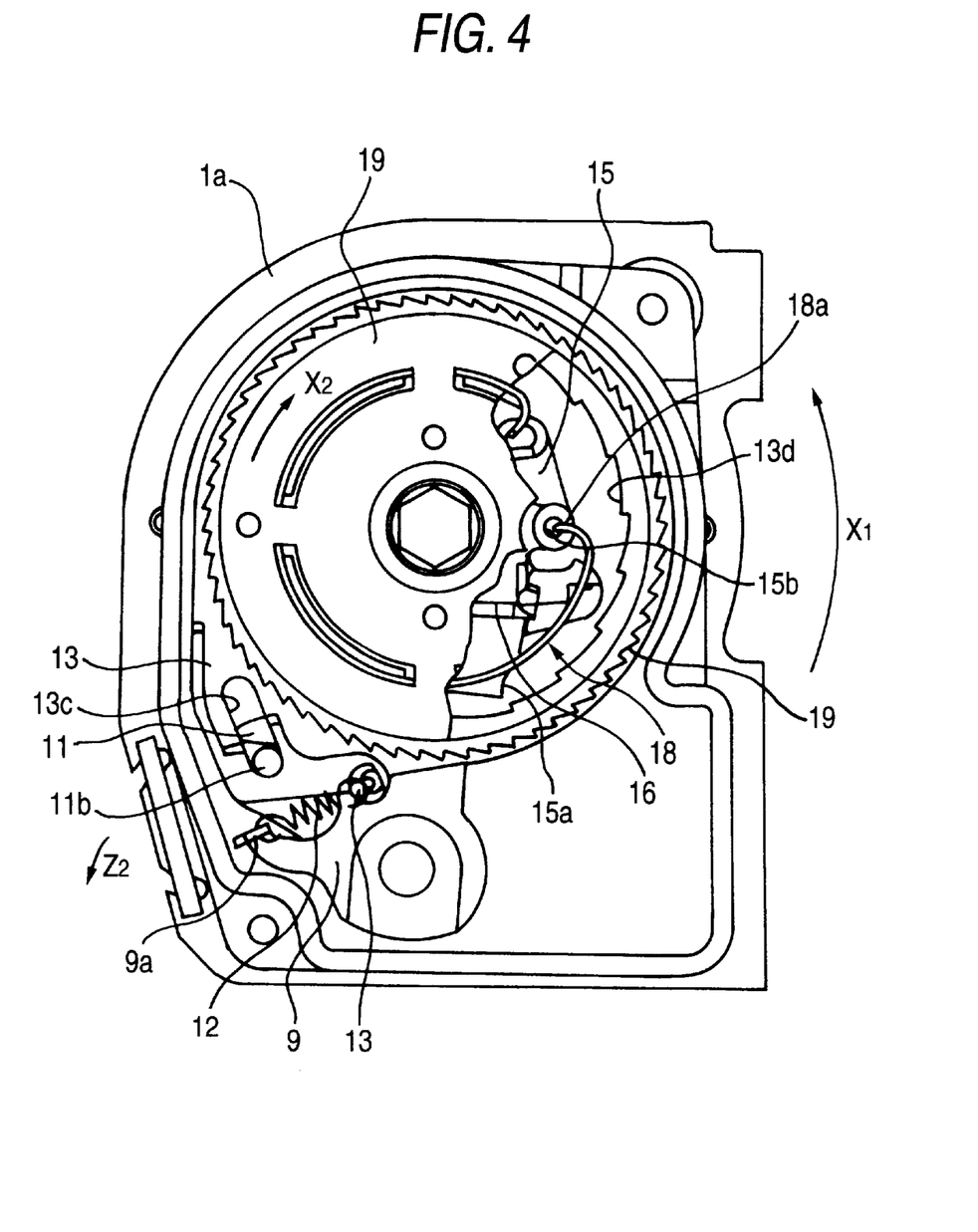
FIG. 4 is a side view of the seat belt retractor shown in FIGS. 1 and 2, showing the state of the start of the operation of the lock mechanism.
Figure 5:
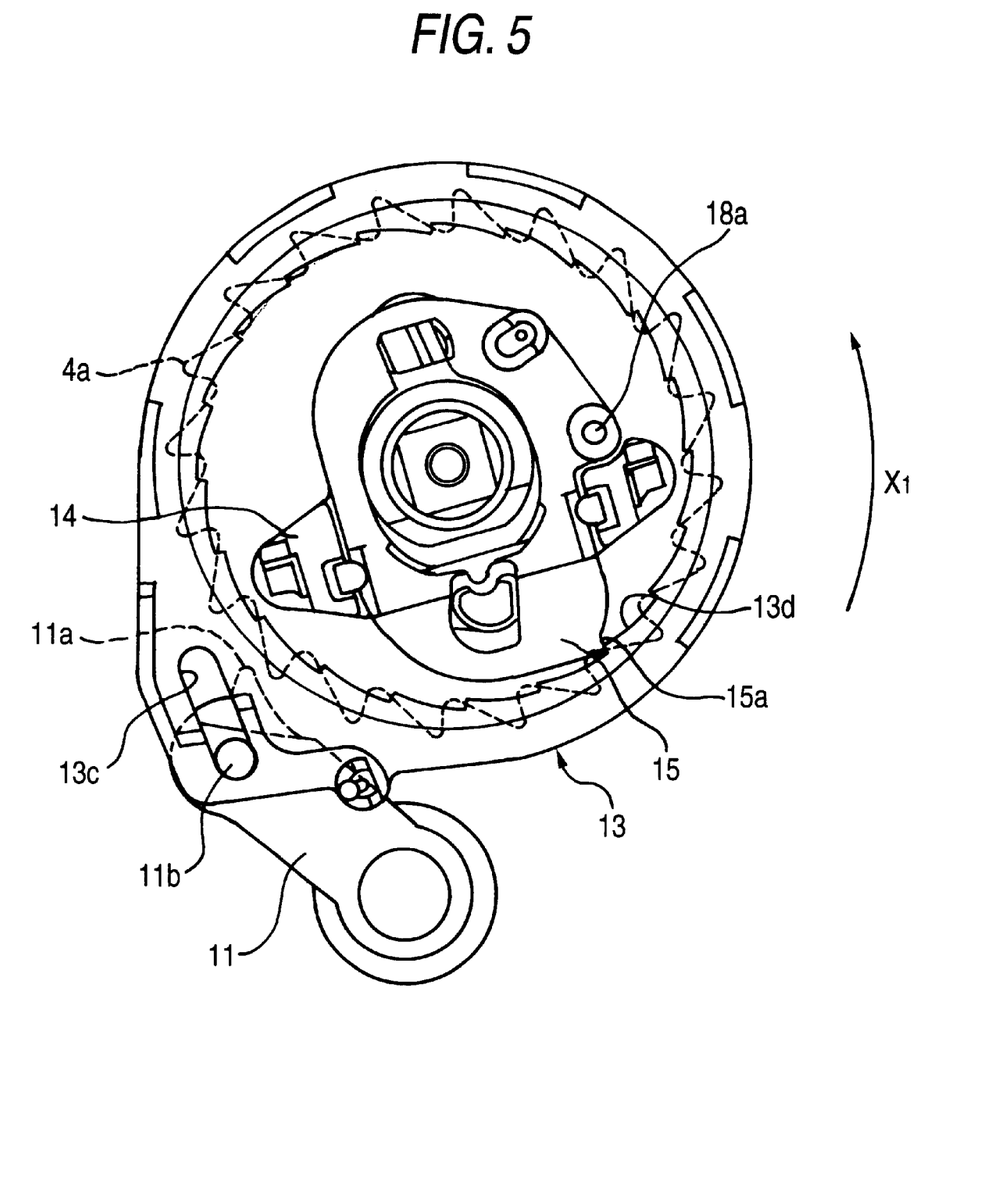
FIG. 5 is a side view of the seat belt retractor shown in FIGS. 1 and 2, showing the state of the meshing engagement between a lock member of the lock mechanism and the latch cup.
Figure 6:
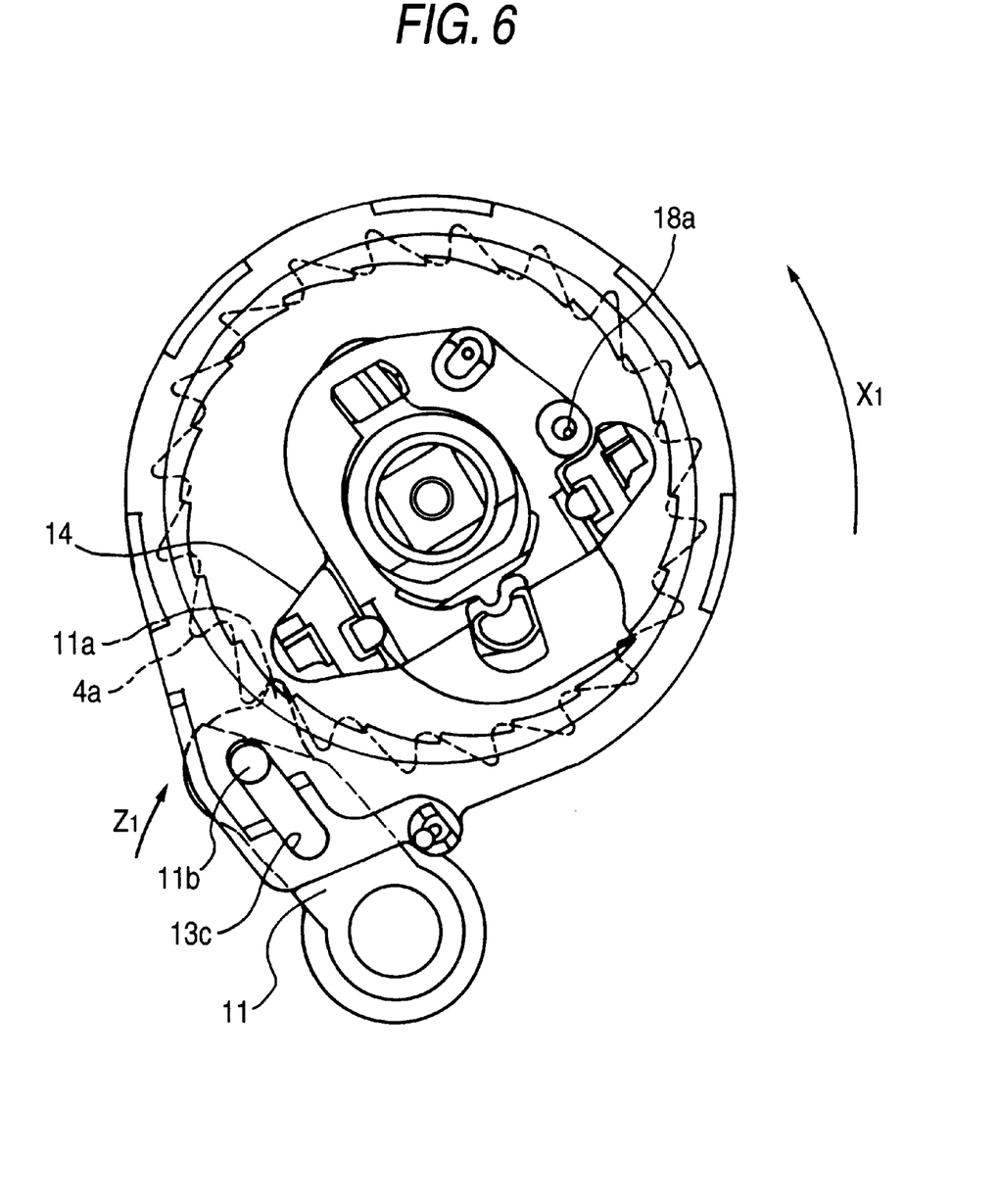
FIG. 6 is a side view of the seat belt retractor shown in FIGS. 1 and 2, showing the completely locked state of the lock mechanism.
Figure 7:
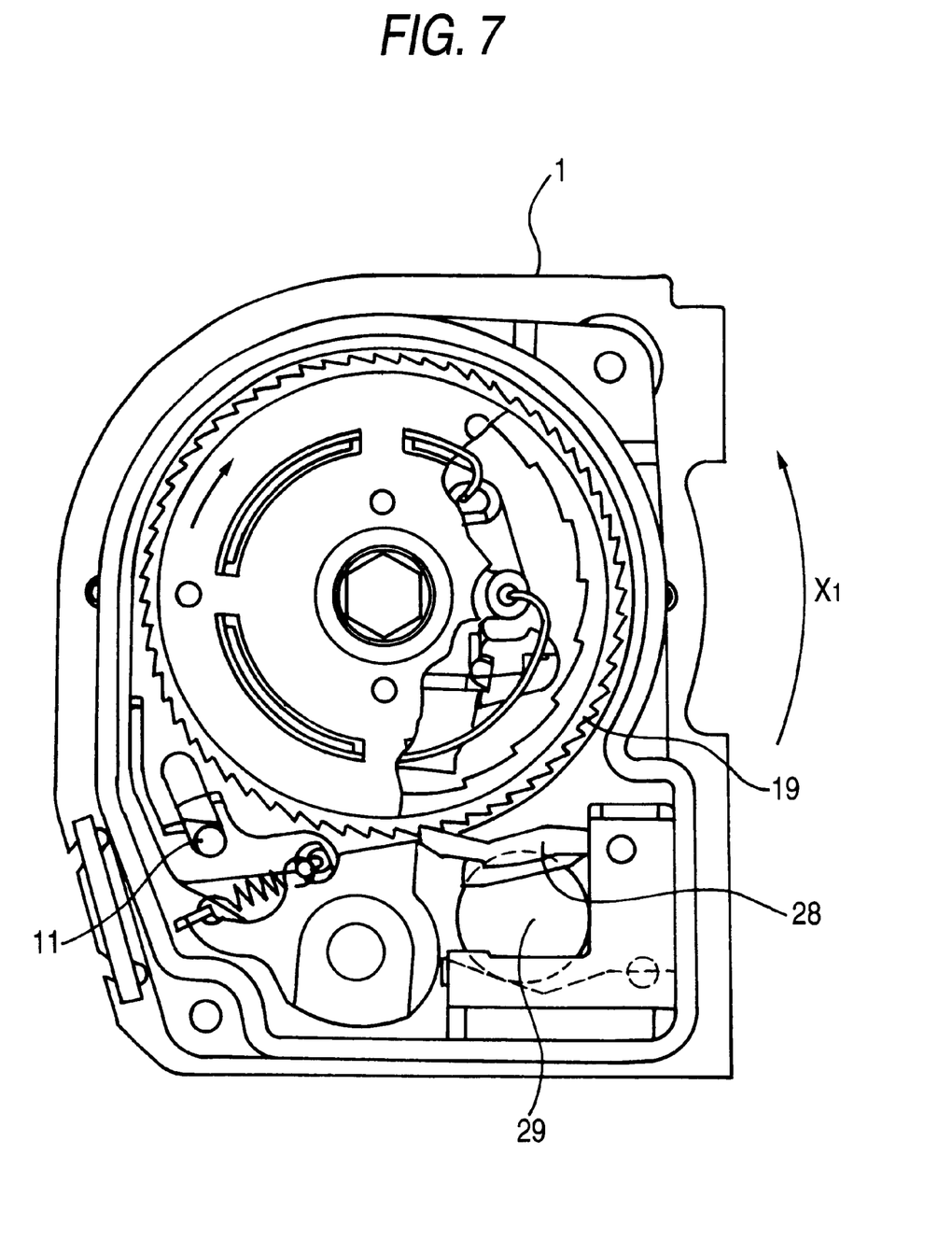
FIG. 7 is a side view of the seat belt retractor shown in FIGS. 1 and 2, showing the state of the start of an operation to be executed by the vehicle body acceleration sensing means of the lock mechanism.
Figure 8:
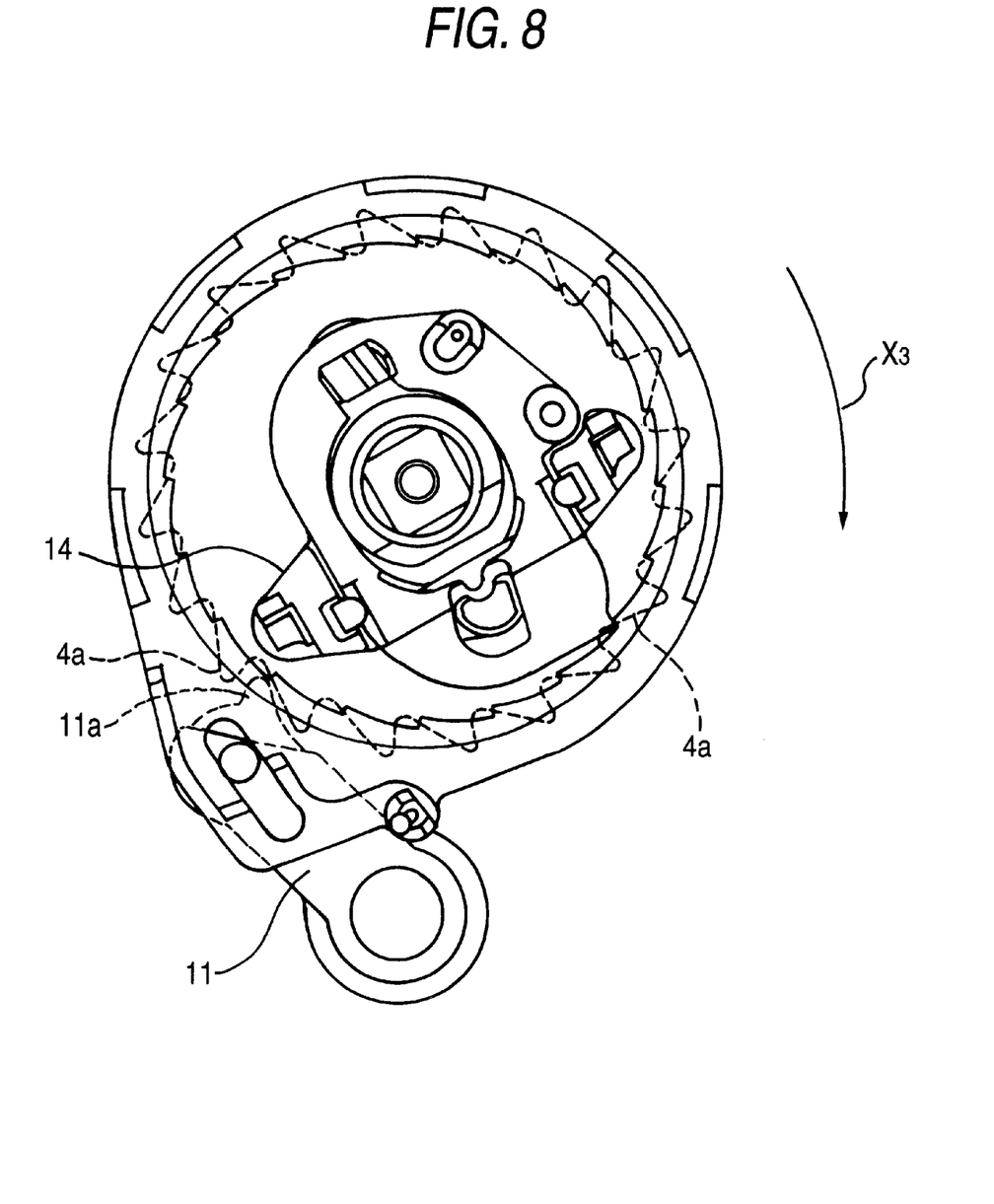
FIG. 8 is a side view of the seat belt retractor shown in FIGS. 1 and 2, showing the state of removing the locked condition of the lock mechanism.

FIGS. 1 to 8 show a first embodiment of a seat belt apparatus according to the invention, which includes a seat belt retractor with a lock mechanism. FIGS. 1 and 2 are respectively exploded perspective views of a seat belt retractor with a lock mechanism employed in the first embodiment, while these figures are connected together in the reference character A portion. FIG. 3 is a front view of a latch cup serving as a pawl wheel used in the seat belt retractor shown in FIGS. 1 and 2. FIG. 4 is a side view of the seat belt retractor shown in FIGS. 1 and 2, showing the state of the start of the operation of the lock mechanism. FIG. 5 is a side view of the seat belt retractor shown in FIGS. 1 and 2, showing the state of the meshing engagement between a lock member of the lock mechanism and the latch cup. FIG. 6 is a side view of the seat belt retractor shown in FIGS. 1 and 2, showing the completely locked state of the lock mechanism. FIG. 7 is a side view of the seat belt retractor, showing the engaged state of a sensor arm included in vehicle body acceleration sensing means when a locking operation is started by the operation of the vehicle body acceleration sensing means. FIG. 8 is a side view of the seat belt retractor shown in FIGS. 1 and 2, showing a state thereof in which the locked state of the lock mechanism is removed.

In the exploded perspective views of the seat belt retractor shown in FIGS. 1 and 2, a base 1 is structured such that most of it has a U-shaped section. The base 1 includes two side plates 1*a* and 1*b* which are disposed opposed to each other and, in the two side plates 1*a* and 1*b*, there are formed through holes 1*c* and 1*d* respectively. A winding shaft 4, which serves as the center shaft of a bobbin 2 around which a webbing can be wound, is rotatably interposed between the through holes 1*c* and 1*d* through left and right plastic bushes 3*a*, 3*b* and a retainer 5. The retainer 5 is rotatably fitted with a lower cover 6 which can be mounted onto the side surface of the side plate 1*b*.

Also, on one end portion of the winding shaft 4, there are disposed a known winding spring device 7 which normally energizes the winding shaft 4 in the webbing winding direction, and a pre-tensioner (not shown) which, in the case of a vehicle collision, rotates the winding shaft 4 in a direction where the loosening of the seat belt is removed.

On the other hand, on the other end portion of the winding shaft 4, there is disposed an emergency lock mechanism which is used to prevent the webbing from being played out in an emergency. The emergency lock mechanism includes a latch plate 4a fixed to the other end portion of the winding shaft 4 and, externally of the latch plate 4a, there is projected part of the winding shaft 4, where a tension plate 9 is loosely fitted with a latch cup 13 serving as a pawl wheel (a latch member) having internal teeth 13d respectively serving as ratchet teeth.

And, in the present embodiment, the latch cup 13 is structured such that, as shown in FIG. 3, as the internal teeth 13d, there are mixedly arranged two kinds of ratchet teeth T1 and T2 differing in addendum circle diameter, that is, the ratchet teeth T1 and T2 are alternately arranged in the peripheral direction of the latch cup 13.

In FIG. 3, an addendum circle P1 corresponds to the ratchet teeth T1, whereas an addendum circle P2 corresponds to the ratchet teeth T2.

By the way, on and over spring hanger 13b provided on the latch cup 13 and a spring hanger 9a provided on the tension plate 9, there is mounted a return spring 12, whereby an urging force to rotate the latch cup 13 in the arrow mark X2 direction is being applied to the latch cup 13.

And, on the portion of the winding shaft 4 that is situated outside the latch cup 13, there are fixed a lock member 15 serving as a pawl member, a sensor spring 16, and a flange 14, which cooperate together in forming lock means 31; and, the lock member 15 includes a lock portion 15a serving as a pawl portion to be engaged with the internal teeth 13d.

Further, outside the lock member 15, there is disposed a ratchet wheel 19 serving as an inertial member which is loosely fitted with a tapping screw 20 threadedly engaged with the flange 14 through a plane washer 17; and, on the outer peripheral surface of the ratchet wheel 19, there are formed a plurality of teeth 19a which face in the belt pay-out direction and are can be engaged with a sensor arm 28 of vehicle body acceleration sensing means 32 (which will be discussed later). Also, on the mounting portion of the ratchet wheel 19 that is formed in the interior portion of the ratchet wheel, there is slidably mounted a friction spring 18, while the friction spring 18 is engaged with the lock member 15. Therefore, the ratchet wheel 19 not only can be rotated integrally with the winding shaft 4 but also can be shifted with respect to the winding shaft 4.

To obtain the friction spring 18, a linear-shaped spring steel member is curved into an annular shape, the two end portions of the thus curved spring steel member are once bent in the radial direction and, after then, the respective tip end portions of the two end portions are further bent in the same axial direction to thereby form two engaging portions 18a and 18b. Thus, the friction spring 18 has a symmetric shape. And, the engaging portions 18a and 18b are respectively engaged with a pair of securing portions, that is, holes 15b and 15c formed in the lock member 15, which restrict the deformation of the friction spring 18 not only in the diameter enlarging direction but also in the diameter reducing direction.

Also, a pawl 11, which can be engaged with the latch plate 4a to thereby prevent the latch plate 4a from rotating in the webbing pay-out direction (in FIG. 1, in the arrow mark X1 direction), is rotatably supported externally of the side plates 1a and 1b in such a manner that it can be engaged with and disengaged from the latch plate 4a through a pawl pin 10. One end portion of the pawl pin 10 is fitted into through holes 33 respectively formed in the two side plates 1a and 1b and the other end portion thereof is fitted into a through hole 9b formed in the tension plate 9, whereby the pawl pin 10 is prevented from falling down by the load that is given by the mutual meshing engagement between the pawl 11 and latch plate 4a. Accordingly, the pawl 11 can be oscilatingly rotated about the through holes 33. And, on the pawl 11, there is projectingly provided a pawl guide projection 11b, and this pawl guide projection 11b can be inserted into a pawl guide hole 13c which is projectingly formed in the outer peripheral portion of the latch cup 13.

Further, in the lower portions of the side plates 1a and 1b, there is fixedly disposed a sensor case 27 which forms vehicle body acceleration sensing means 32 and, in the hollow portion of the sensor case 27, not only there is disposed a ball weight 29 serving as a sensor but also there is oscillatingly mounted a sensor arm 28 having a projection 28a. And, outside the side plate 1a, there is disposed a sensor cover 21 in such a manner that it covers the above-mentioned emergency lock mechanism.

Next, description will be given below of the operation of the seat belt retractor.

Firstly, in a normal use state, as shown in FIG. 4, the latch cup 13 is urged in the webbing take-up direction (in the arrow mark X2 direction) by the urging force of the return spring 12 mounted on and over the spring hanger 13b of the latch cup 13 and the spring hanger 9a of the tension plate 9, the pawl 11 with the pawl guide projection 11b to be engaged with the ball guide hole 13c is urged in the arrow mark Z2 direction where it is not engaged with the latch plate 4a, and the lock portion 15a of the lock member 15 is urged by the urging force of the sensor spring 16 to a position where it is not meshingly engaged with the internal teeth 13d of the latch cup 13, whereby the webbing can be played out freely.

In case where, in an emergency such as a collision, tension is applied to the webbing to thereby apply a shocking webbing-pay-out-direction (arrow-mark-X1-direction) rotational force of a given level or more to the winding shaft 4, the ratchet wheel 19 receives the force of inertia so that the rotation of the ratchet wheel 19 is delayed with respect to the webbing-pay-out-direction rotation of the winding shaft 4. And, in case where the force, with which the engaging portion 18a of the friction spring 18 mounted on the mounting portion of the ratchet wheel 19 pushes the inner surface of the hole 15b of the lock member 15 in a direction where the lock portion 15a can be meshingly engaged with the inner teeth 13d, is greater than the urging force of the sensor spring 16, the lock member 15 is moved in a direction where the lock portion 15a can be meshingly engaged with the inner teeth 13d.

Further, in case where the winding shaft 4 is rotated in the webbing pay-out direction, as shown in FIG. 5, the lock portion 15a of the lock member 15 is meshingly engaged with the inner teeth 13d of the latch cup 13 and the rotational force of the flange 14 is transmitted to the latch cup 13 to thereby rotate the latch cup 13 integrally with the winding shaft 4 in the arrow mark X1 direction against the urging force of the return spring 12. Due to this, as shown in FIG. 6, the pawl guide hole 13c in engagement with the pawl guide projection 11b is rotated in the arrow mark Z1 direction through the pawl guide projection 11b to thereby bring the engaging portion 11a into engagement with the latch plate 4a. As a result of this, the pawl 11 prevents the rotation of the latch plate 4a in the arrow mark X1 direction, that is, the pay-out of the webbing, hereby locking the webbing.

Also, in case where the vehicle receives a speed variation of a given level or greater in an emergency, the ball weight 29 is caused to roll to thereby oscillate the sensor arm 28, so that, as shown in FIG. 7, the leading end 28a of the sensor arm 28 is meshingly engaged with the one of the teeth 19a of the ratchet wheel 19; and, therefore, the rotation of the ratchet wheel 19 in the belt pay-out direction can be prevented. And, in a state where the ratchet wheel 19 is prevented against rotation, in case where the webbing is played out further, the rotation of the ratchet wheel 19 is delayed with respect to the rotation of the winding shaft 4 in the webbing pay-out direction to thereby actuate the lock means 31, so that the pay-out of the webbing can be locked as described above.

In case where the webbing is taken up from the locked state shown in FIG. 6, as shown by the arrow mark X3 in FIG. 8, due to the slight rotation shift of the winding shaft 4 in the take-up direction, there is caused a clearance between the tooth of the latch plate 4a and the engaging portion 11a of the pawl 11, thereby removing the locked state of the webbing.

As described above, according to the thus structured seat belt retractor, in the pay-out of the webbing, the engagement between the internal teeth 13d of the latch cup 13 and the lock portion 15a of the lock member 15, or the engagement of the sensor arm 28 of the vehicle body acceleration sensing means 32 with the ratchet wheel 19 causes the delayed rotation of the ratchet wheel 19, thereby providing the locked state in which the engaging portion 11a of the pawl 11 is engaged with the latch plate 4a.

And, the engaging operation between the internal teeth 13d of the latch cup 13 and the lock portion 15a of the lock member 15 in the pay-out of the webbing can occur in case where the webbing is taken up violently with the full urging force of the winding spring when removing the mounting of the seat belt, or in case where the door of the vehicle opened is closed with great force.

The reason for this is as follows: that is, when removing the mounting of the seat belt, in case where the webbing is taken up with great force, due to a reaction to the impact given when the entire quantity of the webbing is taken up, in the winding shaft, there is instantaneously generated rotation acceleration in the webbing pay-out direction.

Also, in case where the door is closed with great force, due to the then applied impact, there is applied to the vehicle body acceleration sensing means 32 acceleration of a given level or more in the vertical direction or in the horizontal direction.

However, the oscillating motion of the lock member 15 serving as a pawl member for engagement with the latch cup 13 varies according to the level of acceleration applied thereto; and, when the acceleration applied is small, the motion of the lock member 15 is also small.

Generally, the webbing pay-out acceleration, which is applied onto the winding shaft instantaneously due to the impact given when the webbing is rewound up to the terminal end thereof when removing the mounting of the webbing, and the acceleration to be detected by the vehicle acceleration sensor when the vehicle door is closed with great force, normally, correspond to the value that exceeds the operation standard of the lock mechanism; but, when compared with the acceleration that occurs in an actual vehicle collision, they are rather small.

And, when the lock member 15 serving as a pawl member is engaged with the latch cup 13 serving as a pawl wheel due to the action of such small acceleration, in the above-described structure, since the ratchet teeth to be arranged on the latch cup 13 are composed of two kinds of ratchet teeth differing in addendum circle diameter, in case where the ratchet teeth to be engaged with the lock member 15 are, for example, the ratchet teeth T2 each having an addendum circle diameter set larger than the standard one, the lock portion 15a of the lock member 15 cannot reach the ratchet teeth T2, so that the engagement between the lock member 15 and the ratchet teeth T2 cannot be attained.

Also, even when the lock portion 15a of the lock member 15 is locked with respect to the ratchet teeth T2, in case where, as described above, each of the ratchet teeth T2 to be engaged with the lock portion 15a of the lock member 15 has an addendum circle diameter larger than the standard one, the engagement between the lock portion 15a and its mating ratchet tooth is shallow, which can reduce the webbing operation force and operation quantity necessary for removal of the locked state of the lock portion 15a when compared with the conventional structure.

Therefore, according to the above-described structure, even in case where the webbing is returned with great force when removing the mounting of the webbing, there can be reduced a possibility that the end lock phenomenon can occur and, even in case where the end lock phenomenon occurs, there can be increased the opportunity to facilitate the removal of the end lock phenomenon, thereby being able to improve the lowered operation efficiency caused by the end lock phenomenon.

Also, in the case of a retractor with a pre-tensioner, since large webbing pay-out acceleration acts in the lock operation after the operation of the pre-tensioner, there is a fear that the extension quantity of the webbing can increase; however, when such large acceleration acts, the lock member 15 serving as a pawl member can be engaged with both of the ratchet teeth T1 and T2, the occupant can be restricted without increasing the extension quantity of the webbing.

By the way, in the above-mentioned embodiment, as the internal teeth 13d of the latch cup 13, there are provided two kinds of ratchet teeth T1, T2 which are different in the addendum circle diameter. However, according to the invention, three or more kinds of ratchet teeth differing in addendum circle diameter may also be mixedly arranged in the peripheral direction of the latch cup 13; that is, the kinds of the ratchet teeth to be provided are not limited to the above-mentioned embodiment.

Also, in the above-mentioned embodiment, two kinds of ratchet teeth are arranged alternately. However, the manner of mixed arrangement is not limited to the manner employed in the above-mentioned embodiment. For example, there can also be employed a mixed arrangement manner in which two ratchet teeth T1 each having a small addendum circle diameter are arranged successively and, after then, one ratchet tooth T2 having a large addendum circle diameter is arranged.

Figure 9:
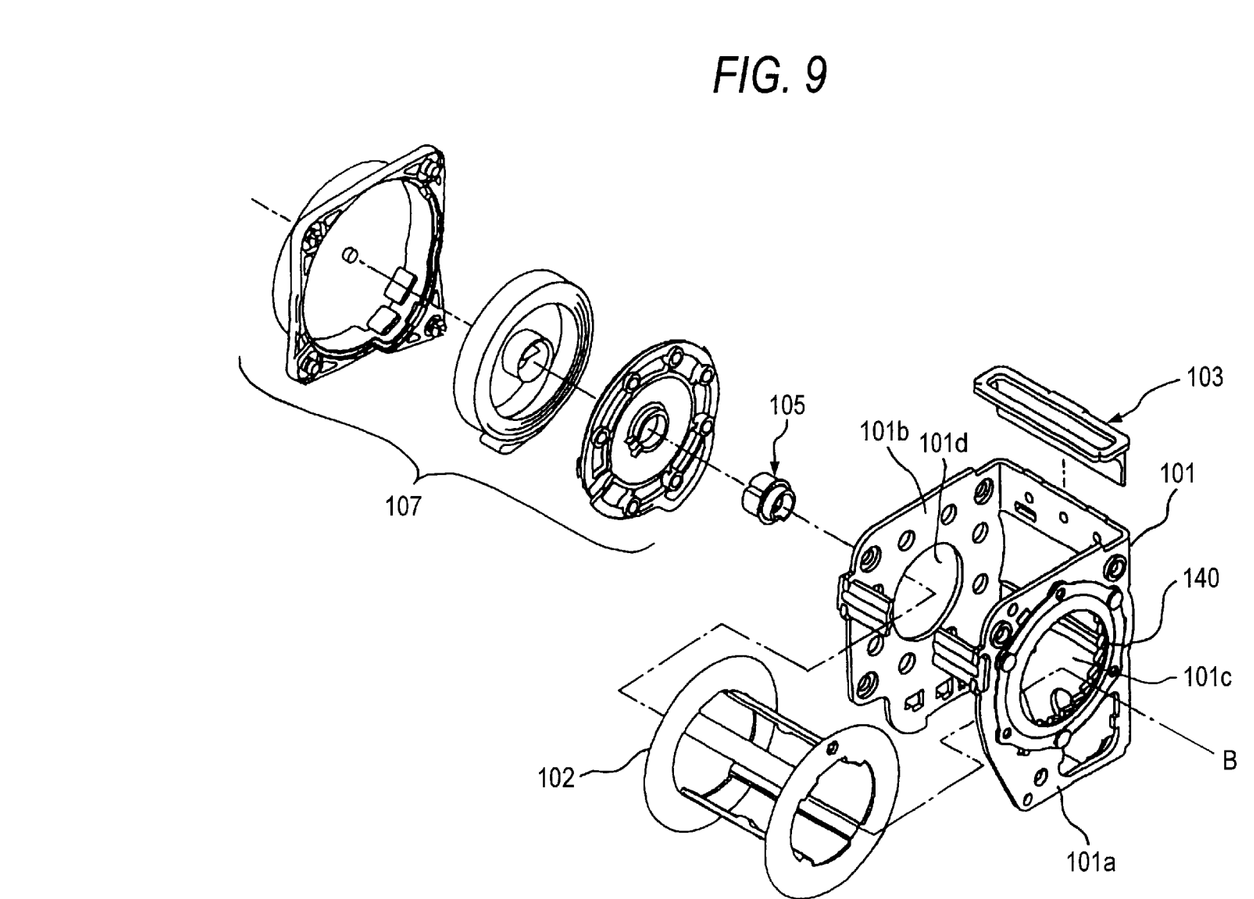
FIG. 9 is an exploded perspective view of a seat belt retractor with a lock mechanism employed in a second embodiment of a seat belt apparatus according to the invention.
Figure 10:
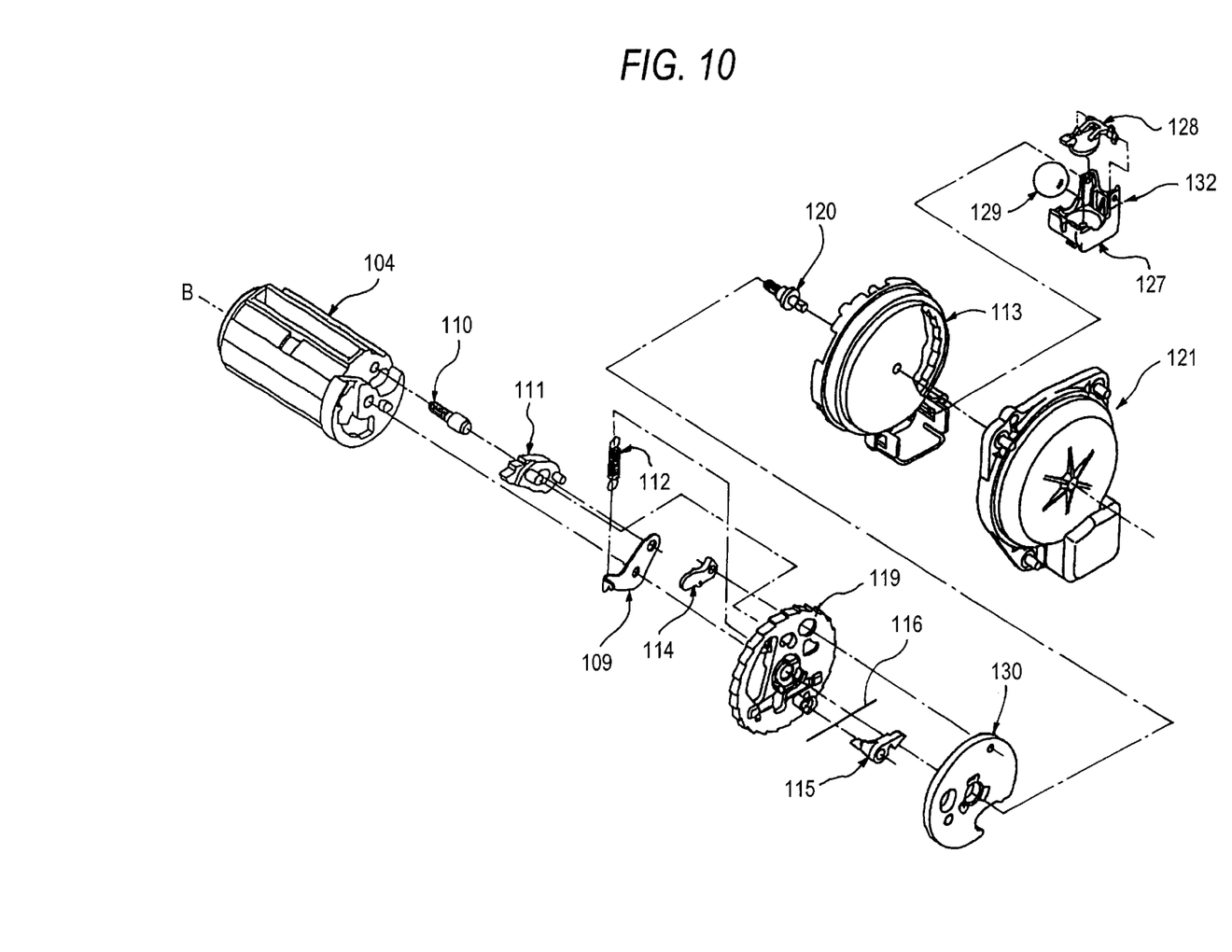
FIG. 10 is an exploded perspective view of the seat belt retractor with a lock mechanism employed in the second embodiment of a seat belt apparatus according to the invention.

Now, FIGS. 9 and 10 are respectively exploded perspective view of a second embodiment of a seat belt retractor with a lock mechanism for a seat belt apparatus according to the invention; and, FIGS. 9 and 10 continue with each other in the reference character B portion.

In the seat belt retractor with a lock mechanism according to the second embodiment, a base 101 is structured such that most of it has a U-shaped section, it includes two mutually opposed side plates 101a and 101b and, in the two side plates 101a and 101b, there are formed through holes 101c and 101d respectively. A winding shaft 104, which serves as a center shaft of a bobbin 102 on which a webbing can be wound, is bridgingly provided over the through holes 101c and 101d through a retainer 105, a pin 120 and a gear case 113 in such a manner that the winding shaft 104 can be rotated. On the side plate 101b, there is mounted a winding spring device 107 which energizes the bobbin 102 in the take-up direction.

The webbing, which has been taken up on the bobbin 102, is played out through a webbing guide 103 which is mounted on the upper portion of the back plate of the base 101.

In the other end portion of the winding shaft 104, there is disposed an emergency lock mechanism which is used to prevent the pay-out of the webbing in an emergency. This emergency lock mechanism brings a pawl 111, which is rotatably supported through a pawl pin 110 on the other end portion of the winding shaft 104, into engagement with a latch plate 140 fixedly mounted on the side wall 101a of the base 101, thereby preventing the bobbin 102 from rotating in the webbing pay-out direction.

Also, on the other end portion of the winding shaft 104, there are mounted, through the pin 120, a ratchet wheel 119 serving as a pawl wheel and an inertial plate 130 in such a manner that they can be rotated with respect to each other. And, on the ratchet wheel 119, as a drive mechanism which brings the pawl 111 into engagement with the latch plate 140 when acceleration of a predetermined value or larger in the webbing pay-out direction is applied to the winding shaft 104 or when acceleration of a predetermined value or larger is applied to the vehicle due to a collision, there are mounted a plate 109, a lever 114, a spring 112, a lock arm 115, and a sensor spring 116.

Figure 11:
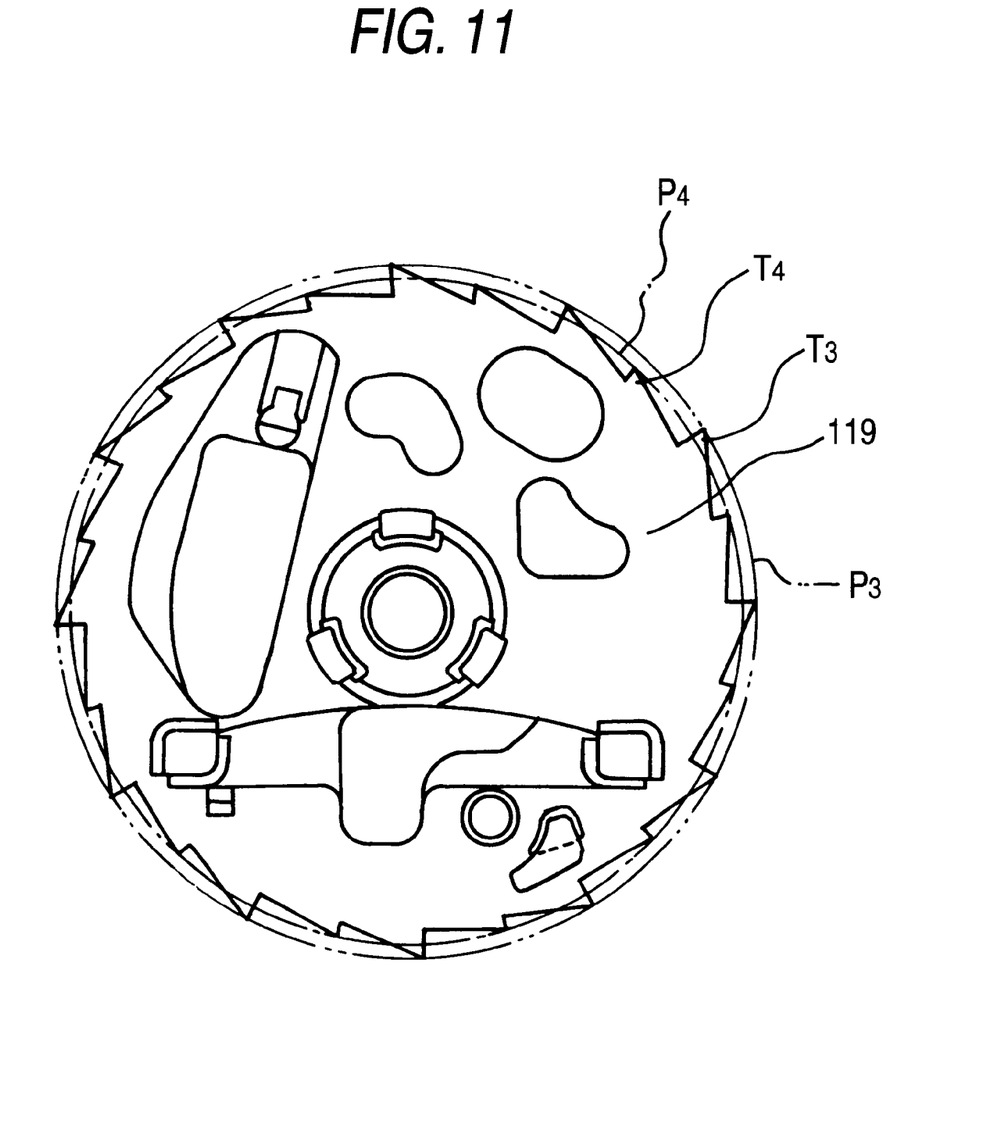
FIG. 11 is a front view of a ratchet wheel serving as a pawl member used in the seat belt retractor shown in FIGS. 10 and 11.

In the case of the present embodiment, the ratchet wheel 119 is structured such that, as shown in FIG. 11, as the external ratchet-teeth thereof, two kinds of ratchet teeth T3 and T4 differing in addendum circle diameter are arranged mixedly, that is, alternately in the peripheral direction of the ratchet wheel 119.

By the way, in FIG. 11, an addendum circle P3 corresponds to the ratchet teeth T3, whereas an addendum circle P4 corresponds to the ratchet teeth T4.

And, in the case of the present embodiment, vehicle body acceleration sensing means 132, which is a sensor for detecting the acceleration that is applied to a vehicle, is mounted on the lower portion of the gear case 113 and is covered with a sensor cover 121 which can be mounted on the side plate 101a of the base 101 from outside the gear case 113.

The vehicle body acceleration sensing means 132 comprises a sensor case 127 to be fixed to the gear case 113, a ball weight 129 which is mounted in the hollow portion of the sensor case 127 and can be shifted according to the acceleration applied to the vehicle body, and a sensor arm 128 which can be oscillated according to the shift of the ball weight 129.

This sensor arm 128 is a pawl member the leading end portion of which provides a pawl portion to be engaged with the external teeth, that is, ratchet teeth T1 and T2 formed in the ratchet wheel 119. For example, in case where the acceleration applied to the vehicle body becomes a predetermined value or more and the ball weight 129 is thereby shifted by a given amount or more, the sensor arm 128 is oscillated; and, due to the oscillation of the sensor arm 128, the leading end portion of the sensor arm 128 is meshingly engaged with the ratchet teeth of the ratchet wheel 119 to thereby restrict the rotation of the ratchet wheel 119 and thus delay the rotation of the ratchet wheel 119 with respect to the winding shaft 104, with the result that there is caused a locked state in which the pawl 111 is engaged with the latch plate 140.

As in the second embodiment, also in the structure that, as the external teeth, that is, ratchet teeth to be formed in the ratchet wheel 119, two kinds of ratchet teeth T3 and T4 differing in addendum circle diameter are arranged mixedly, that is, alternately in the peripheral direction of the ratchet wheel 119, for example, in case where the ratchet teeth to be engaged with the sensor arm 128 are the ratchet teeth T4 each having a small addendum circle diameter, the engagement of the sensor arm 128 cannot be attained or may be shallow. Therefore, similarly to the structure that, as shown in the previously described first embodiment, as the ratchet teeth of the latch cup 13, the two kinds of ratchet teeth Ti and T2 differing in addendum circle diameter are mixedly arranged, there can be reduced the possibility that the end lock phenomenon can occur; and, even in case where the end lock phenomenon occurs, there can be increased the possibility that the removal of the end lock phenomenon can be facilitated, thereby being able to improve the lowered operation efficiency caused by the end lock phenomenon.

Also, in the case of a retractor with a pre-tensioner, since large webbing pay-out acceleration is caused to act in the lock operation time after the operation of the pre-tensioner, there is a fear that the webbing extension quantity can be large;

however, when such large acceleration acts, the sensor arm 128 serving as a pawl member are engaged with both of the ratchet teeth T3 and T4, so that the occupant can be restricted positively without increasing the webbing extension quantity.

As described above, as in the present invention, a pawl wheel including two or more kinds of ratchet teeth differing in addendum circle diameter can be applied effectively to any type of pawl wheels, provided that they form a lock mechanism.

INDUSTRIAL APPLICABILITY

In a seat belt apparatus including a seat belt retractor with a lock mechanism according to the invention, when the pawl member is engaged with the pawl wheel due to relatively small acceleration applied in the webbing mounting removing operation or in the door closing operation, because the ratchet teeth arranged on the pawl wheel are composed of mixedly arranged two or more kinds of ratchet teeth which are different in the addendum circle diameter, in case where the internal teeth, that is, the ratchet teeth to be engaged with the pawl member have an addendum circle diameter set larger than the standard one, the pawl member does not reach the ratchet teeth but the engagement thereof cannot be attained. Also, even in a locked state in which the pawl member is engaged with the pawl wheel, in the case of the internal teeth, that is, ratchet teeth of the ratchet wheel to be engaged with the pawl member having a larger addendum circle diameter than the standard one, the engagement between the pawl member and the ratchet tooth to be engaged therewith is shallow, thereby being able to reduce the webbing operation force and operation quantity necessary for removal of the locked state when compared with the conventional structure.

Therefore, even in case where the webbing is returned with great force when removing the mounting of the webbing, there can be reduced the possibility that the end lock phenomenon can occur; and, even in case where the end lock phenomenon occurs, there can be increased the possibility that the removal of the end lock phenomenon can be facilitated, thereby being able to improve the lowered operation efficiency caused by the end lock phenomenon.

Also, in the case of a retractor with a pre-tensioner, since large webbing pay-out acceleration is caused to act in the lock operation time after the operation of the pre-tensioner, there is a fear that the webbing extension quantity can be large; however, when such large acceleration acts, the pawl member are engaged with both of the ratchet teeth, so that the occupant can be restricted positively without increasing the webbing extension quantity.

What is claimed is:

1. A seat belt apparatus including a seat belt retractor with a lock mechanism comprising:
    a webbing wound around a bobbin; and
    a pawl member engaged with a pawl wheel, when an acceleration of a vehicle body or a pay-out acceleration of the webbing is a predetermined value or more, to thereby lock a rotation in a webbing pay-out direction, the pawl wheel having two or more kinds of ratchet teeth different in addendum circle diameter from each other and are mixedly arranged in a peripheral direction of the pawl wheel.

2. A seat belt apparatus including a seat belt retractor with a lock mechanism comprising:
    a base;
    a winding shaft rotatably supported on the base and urged in a webbing take-up direction; and,
    a lock mechanism providing a first state which connects the winding shaft with the base to prevent the winding shaft from rotating in a webbing pay-out direction and a second state which unconnects the winding shaft with the base,
    wherein the lock mechanism comprises:
        a pawl disposed on one of the base and the winding shaft;
        a latch plate disposed on the other of the base and the winding shaft and engageable with the pawl;
        a pawl wheel for bringing the pawl to a position where the pawl is engaged with the latch plate; and,
        a ratchet wheel rotated relatively with respect to the winding shaft, and bringing a pawl member into engagement with the pawl wheel to connect the winding shaft with the pawl wheel by the relative rotation; and,
    wherein the pawl wheel includes two or more kinds of teeth differing in addendum circle diameter.

3. A seat belt apparatus including a seat belt retractor with a lock mechanism comprising:
    a base;
    a winding shaft rotatably supported on the base and urged in a webbing take-up direction; and,
    a lock mechanism providing a first state which connects the winding shaft with the base to prevent the winding shaft from rotating in a webbing pay-out direction and a second state which unconnects the winding shaft with the base,
    wherein the lock mechanism comprises:
        a pawl disposed on one of the base and the winding shaft;
        a latch plate disposed on the other of the base and the winding shaft and engageable with the pawl;
        a ratchet wheel rotated relatively with respect to the winding shaft, and bringing the pawl to a position where the pawl is engaged with the latch plate; and,
        a pawl wheel and a pawl member, one of which is disposed on the ratchet wheel, the other of which is disposed on the base so as to cause the relative rotation of the ratchet wheel with respect to the winding shaft; and,
    wherein the pawl wheel includes two or more kinds of teeth differing in addendum circle diameter.

* * * * *